United States Patent [19]

Leibowitz

[11] 3,765,013

[45] Oct. 9, 1973

[54] SELF SYNCHRONOUS SERIAL ENCODER/DECODER

[75] Inventor: Lawrence M. Leibowitz, Fairfax, Va.

[73] Assignee: The United States of America as represented by the Secretary of the Navy, Washington, D.C.

[22] Filed: June 23, 1972

[21] Appl. No.: 265,866

[52] U.S. Cl. .......................... 340/347 DD, 340/146.1
[51] Int. Cl. ............................................ H03r 13/24
[58] Field of Search .................. 340/146.1, 347 DD, 340/172.5; 235/154; 178/26 R, 26 A

[56] References Cited

UNITED STATES PATENTS 3,252,138 5/1966 Young ............................ 340/146.1
3,426,323 2/1969 Shimabukuro.................. 340/146.1
3,166,637 1/1965 Oleson ......................... 340/347 DD

*Primary Examiner*—Thomas A. Robinson
*Attorney*—R. S. Sciascia et al.

[57] ABSTRACT

A device to provide a simple means of translating a parallel n-bit data word from a counter or the like to a serial format which is suitable for single channel recording or transmission over a single wire. Also, this device permits the decoding of serial data back to parallel form independent of the exact time location of the leading bit of the serial code.

6 Claims, 3 Drawing Figures

SELF SYNCHRONOUS SERIAL ENCODER/DECODER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The need for efficient transmission of binary information from one point to another over a transmission line has been long recognized in the data transmission arts. However, most systems of the prior art require that a reference marker pulse be placed in front of the serial code to indicate the start of a new binary word. Such systems also require an exact time synchronism with clock signals used for decoding at the receiving end. Furthermore, in the most sophisticated techniques, such as complex multiplexing and gating circuitry, separate circuits for encoding and decoding digital data are required.

Considering the drawbacks of the prior art, I have developed a self-synchronous digital serial encoder/decoder system which may be easily constructed from the common and currently available TTL circuitry. The device is able to encode and decode without the need for a time reference marker pulse and without synchronizing or timing circuitry in the decoding device.

SUMMARY OF THE INVENTION

A data transmission system which needs no marker pulse in front of a serial transmitted digital word is provided by the use of common TTL logic. Essentially, the same system is capable of encoding and decoding information and is particularly adapted for converting information in a parallel format to a serial form (for single line transmission) and reconverting the transmitted information back into a parallel format. This device is especially useful in stored transmission applications such as the storage and subsequent playback of data on magnetic tape.

OBJECTS OF THE INVENTION

An object of this invention is to provide a simple means of translating a parallel n-bit data word into a serial format.

A further object of the invention is to permit the decoding of this serial data back to parallel form without the knowledge of the time location of the leading bit of the serial code.

Another object of the present invention is to accomplish the translation while using the standard, currently available TTL circuitry.

Other objects, advantages and novel features of the present invention will become apparent from the following detailed description of the invention when considered in conjunction with the accompanying drawings wherein:

DRAWINGS

DETAILED DESCRIPTION

Figure 1:
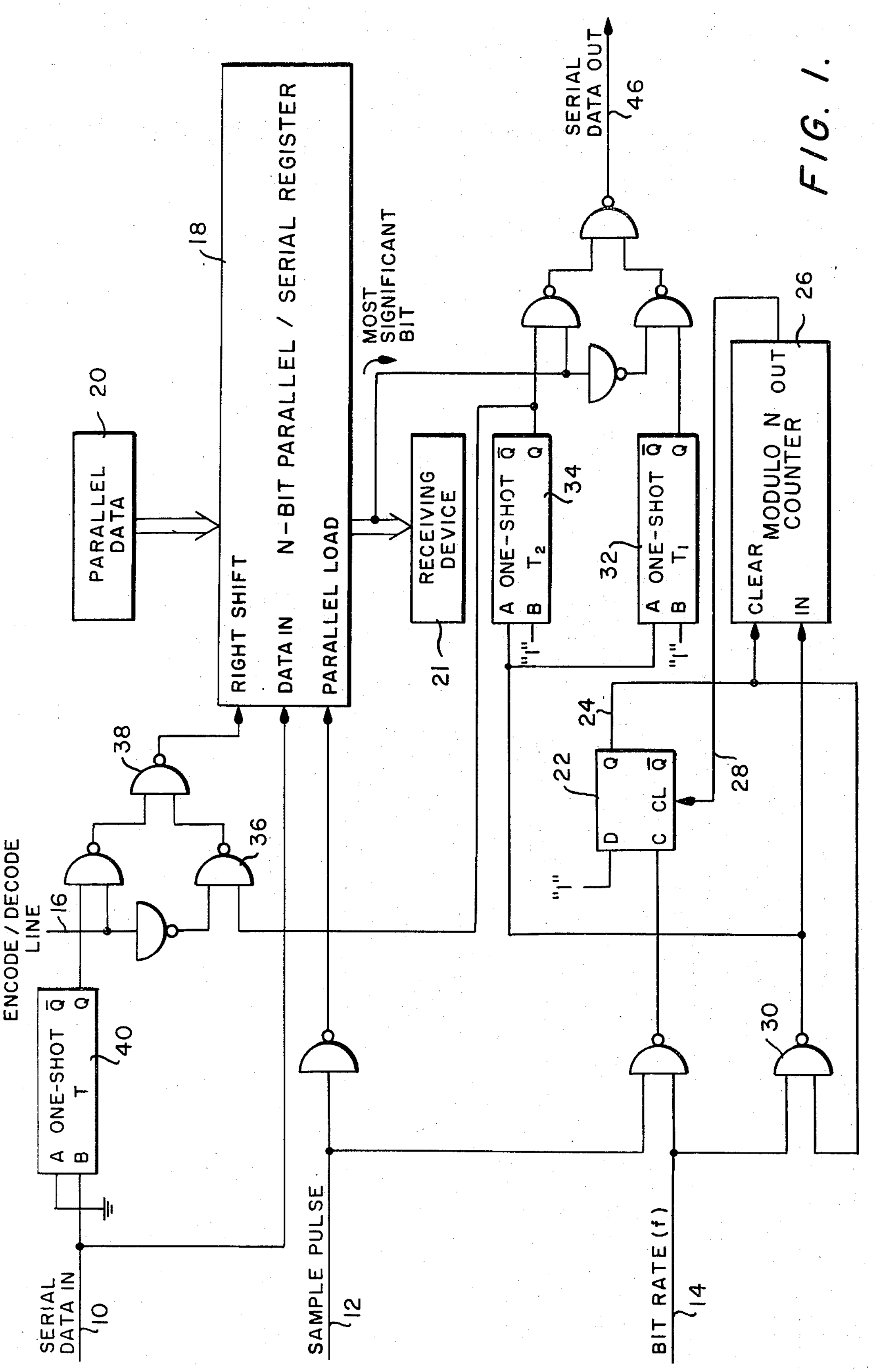
FIG. 1 is a block diagram of the self-synchronous digital serial encoder/decoder.

A logic diagram of the invention is shown in FIG. 1. As can be easily seen the inputs to the device are SERIAL DATA IN 10, SAMPLE PULSE 12, BIT RATE 14, and ENCODE/DECODE line 16.

Figure 2:
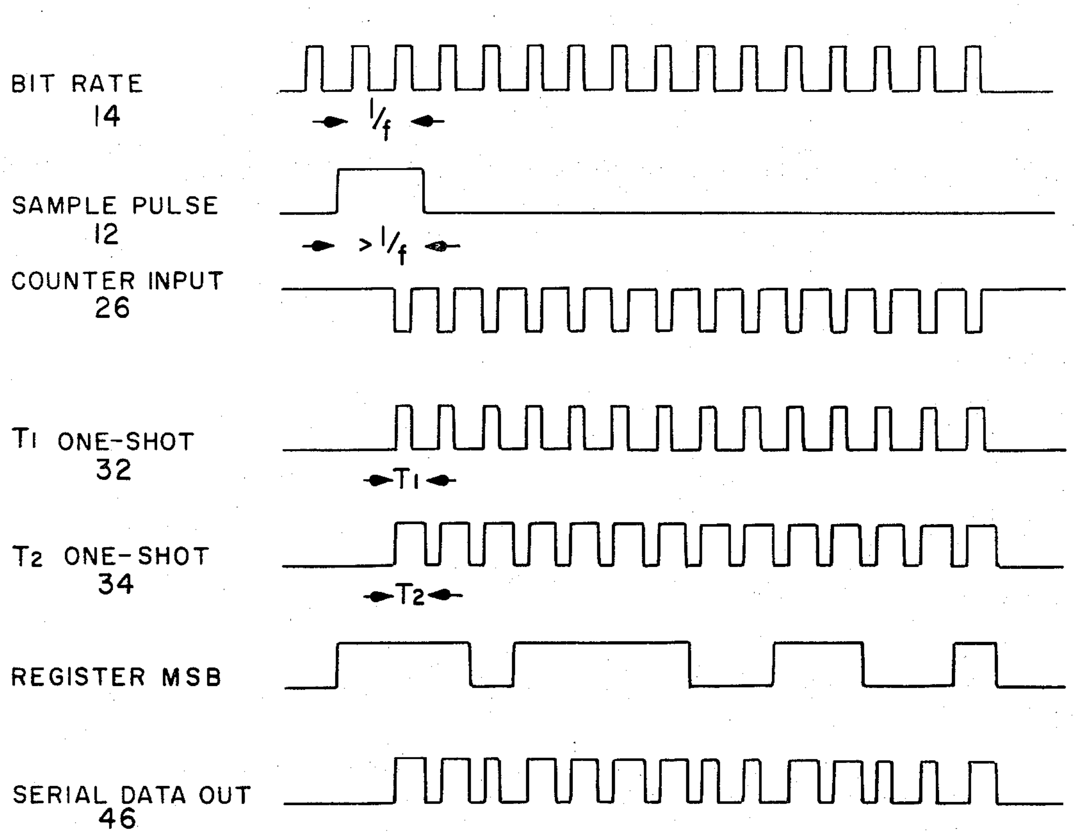
FIG. 2 is a timing diagram of the various functions which take place in the device shown in FIG. 1 for the ENCODE operation.

The BIT RATE 14, as shown in FIG. 2 is the clock frequency, f, generated by any means well known and accepted in the art; although the particular frequency should be selected such that 1/f corresponds to the desired time interval for each bit.

The SAMPLE PULSE 12 must occur at a frequency which is much less than f, and the particular position in time of this pulse determines the time of each sampling of parallel data.

The ENCODE/DECODE line 16, is held to either a logical "1" or "0" depending on the desired mode of operation. For example, for the device as shown in FIG. 1 a "0" on the ENCODE/DECODE line 16, converts parallel loaded data into a serial format. Similarly a "1" on the line 16 provides for serial to parallel translation.

To describe the operation of the invention, the ENCODE mode will be explained where the ENCODE/DECODE line 16 is a logical "0." The operation of the circuit, as shown in FIG. 1, is initiated by the SAMPLE PULSE 12 which loads the parallel data into the parallel/serial shift register 18 from parallel data source 20. The SAMPLE PULSE is at least of width 1/f and thus is coincident with, and gates, at least one trailing edge of the BIT RATE through a NAND gate to a D-type flip-flop 22 setting Q output 24 to a logical "1." This gates the inverted BIT RATE pulses into the modulo N counter 26. When N number of trailing edges have been counted, the D flip-flop 22 is reset by way of clear input 28. Thus, the gate 30 which passes the BIT RATE pulse to the modulo counter 26 is disabled and the counter is reset. Each of the above mentioned N trailing edges trigger two one-shots 32 and 34 each of which generate positive going pulses of $T_1$ and $T_2$ intervals of time respectively; where $T_1 < 1/2f < T_2 < 1/f$. This can best be seen in FIG. 2. The trailing edge of the $T_2$ pulse shifts the register 18 one bit right by way of gates 36 and 38. The most significant bit of the parallel information is obtained from the output of the register 18 and gated with the pulses of width $T_1$ and $T_2$. Thus, as each bit is shifted through, a pulse of width $T_1$ is generated if the bit is a logical "0" or a pulse of width $T_2$ is generated if the bit is a logical "1."

The train of pulses thus formed is SERIAL DATA OUT 16. Timing diagram FIG. 2 is an example of the digital word 11011110011001 to be encoded when N = 14.

Figure 3:
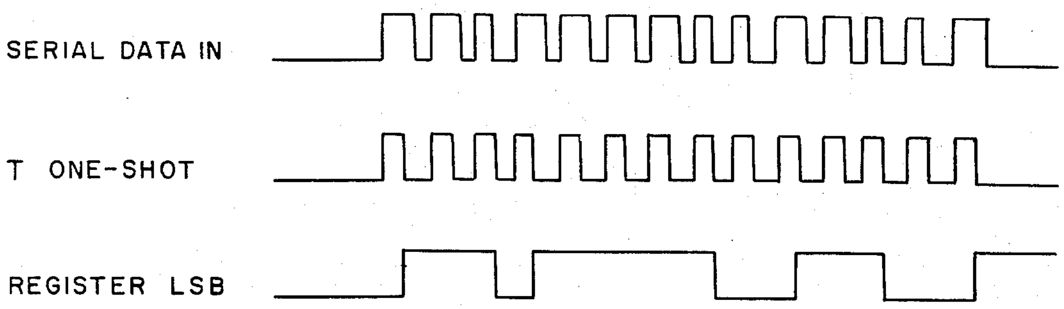
FIG. 3 is a timing diagram for the DECODE operation.

In the DECODE MODE, the ENCODE/DECODE line 16 is set at a logical "1." The SERIAL DATA IN 10, which contains pulses of width $T_1$ or $T_2$ for each bit on each leading edge, triggers a one-shot 40 which generates a positive going pulse of width T which is approximately ½f units of time. These one-shot pulses are used to accept a SERIAL DATA INPUT bit and shift the parallel/serial register 18 one bit right on each of these trailing edges. Thus, if the input bit is a logical "0," and thus represented by a pulse of width $T_1 < T$, at the trailing edge of the shift pulse a logical "0" level is present and is shifted into the register 18. Likewise if the input bit is a logical "1," as represented by a pulse of width $T_2 > T$, a logical 1 level is present at the trailing edge of the shift pulse, and is thus shifted into register 18. In this manner at the end of the N SERIAL DATA IN bits, the register 18 contains the received binary data in parallel form; as represented by the logical "0" and "1" voltage levels. FIG. 3 shows a timing diagram for the DECODE mode for an input binary word 11011110011001.

This system permits binary data to be sampled from digital devices, encoded and transmitted over a single wire, or recorded on magnetic tape, and decoded without the need for time reference marker pulses or synchronization or timing ciruitry in the decoding.

Obviously many modifications and variations of the present invention are possible in light of the above teachings. For example, the type of logic may be varied without compromising the characteristics of the operation of the system. Also, the time delays $T_1$, $T_2$, $T_3$ and the BIT RATE (*f*) may be varied as long as the requirements on their relative magnitudes are maintained. It is therefore to be understood that within the scope of the appended claims, the invention may be practiced otherwise than as specifically claimed.

What is claimed and desired to be secured by Letters Patent of the United States is:

1. A system for translating a parallel n-bit data word into a serial format capable of single line transmission without a time reference marker bit comprising:

parallel/serial shift register means for accepting an n-bit word in parallel format and converting it into serial format as long as said means are enabled;

modulo counter means for enabling said shift register means for a time approximately equal to the time required to sequentially clock the n-bit parallel word into serial form from the most significant bit to the least significant bit;

pulse generating means for sequentially generating a pulse of length $T_1$ where a "0" is present in the most significant bit position in said serial format and a pulse of length $T_2$ where a "1" is present in the most significant bit position to form a serial word.

2. A system for translating a parallel n-bit word into a serial format capable of single line transmission without a time reference marker bit and retranslating said serial format back into an n-bit parallel word, comprising:

parallel/serial shift register means for accepting the n-bit word in parallel format and converting it into serial format as long as said means are enabled;

modulo counter means for enabling said shift register means for a time approximately equal to the time required to sequentially clock the n-bit parallel word into serial form from the most significant bit to the least significant bit;

pulse generating means for sequentially generating a pulse of length $T_1$ where a "0" is present in the most significant bit position in said serial format and a pulse of length $T_2$ where a "1" is present in the most significant bit position to form a serial word;

transmission line means connected to said pulse generating means to permit transmission of said word;

a second parallel/serial shift register means coupled to said transmission line means for accepting the serial word;

comparing means coupled to said shift register means and said transmission line means for determining if the most significant bit is either of length $T_1$ or $T_2$;

shifting means coupled to said comparing means for sequentially loading said parallel/serial shift register means with an "0" when a pulse of width $T_1$ is present and with a "1" when a pulse of width $T_2$ is present.

3. The device as claimed in claim 2 wherein said pulse generating means comprises:

a first and a second one-shot, the first one-shot being capable of generating a pulse of length $T_1$ and the second one-shot capable of generating a pulse of length $T_2$, said one-shots being coupled to said shift register means.

4. The device as claimed in claim 2 wherein said pulse generating means also provides a right shift in said parallel/serial shift register upon the presence of the $T_2$ pulse.

5. The device as claimed in claim 2 wherein said pulse generating means gates the most significant bit of the serial word with the pulses of width $T_1$ and $T_2$.

6. The device as claimed in claim 2 wherein said comparing means includes a one-shot capable of providing a pulse of width T wherein $T_1 < T < T_2$.

* * * * *